(No Model.)
C. G. OSTEMAN.
PHOTOGRAPHIC CAMERA.
No. 502,198. Patented July 25, 1893.
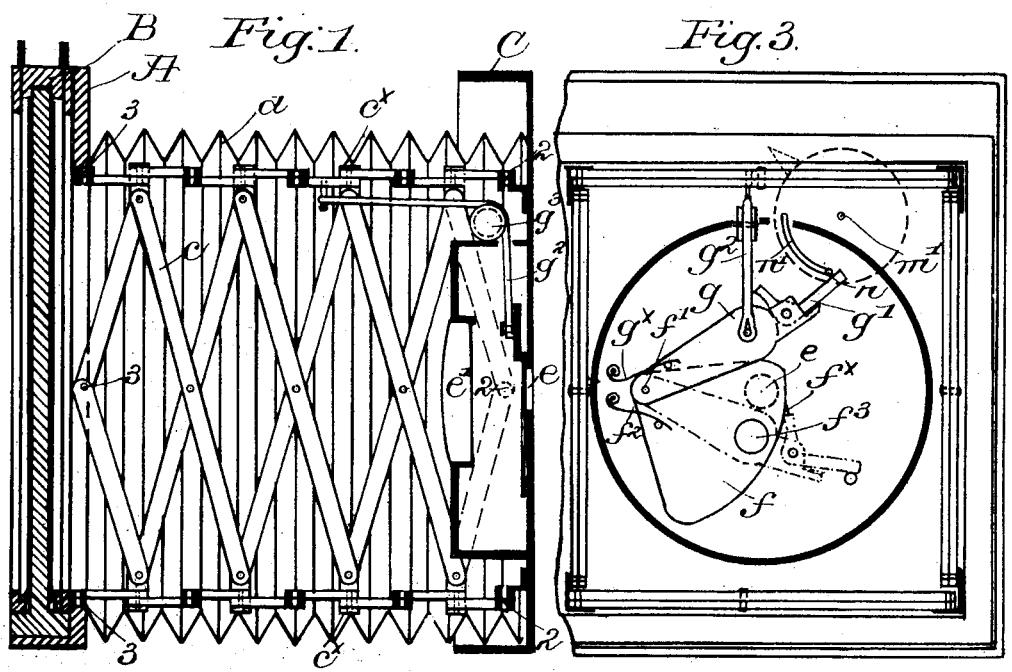
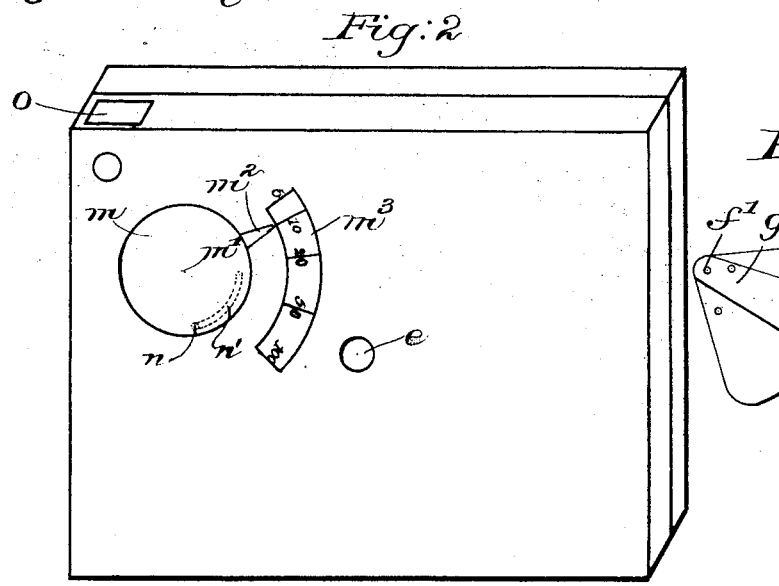
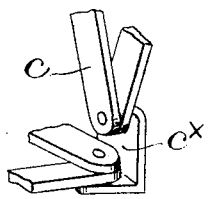
WITNESSES:
Louis N. Gowell
Edward F. Allen
INVENTOR
Carl G. Osteman.
BY Crosby & Gregory
ATTORNEYS

UNITED STATES PATENT OFFICE.

CARL G. OSTEMAN, OF BOSTON, ASSIGNOR OF ONE-HALF TO FREDERICK B. CARPENTER, D. HARRY DARLING, AND E. N. HEATH, OF WAKEFIELD, MASSACHUSETTS.

PHOTOGRAPHIC CAMERA.

SPECIFICATION forming part of Letters Patent No. 502,198, dated July 25, 1893.

Application filed May 12, 1892. Serial No. 432,722. (No model.)

*To all whom it may concern:*

Be it known that I, CARL G. OSTEMAN, of Boston, county of Suffolk, State of Massachusetts, have invented an Improvement in Photographic Cameras, of which the following description, in connection with the accompanying drawings, is a specification, like letters on the drawings representing like parts.

This invention relates to photographic cameras and has for its object to improve the same whereby the sensitized plate or surface is automatically exposed by adjustable means when the camera in focusing has been extended to a predetermined distance, the invention also embodying certain improvements in construction to be fully hereinafter set forth and embodied in the claims.

In the drawings, Figure 1, represents in vertical longitudinal section a camera embodying this invention. Fig. 2, is a perspective view of the camera as it will appear when collapsed; Fig. 3, a partial view of the back side of the front board or frame of the camera to show the shutter and the operating and tripping mechanism therefor. Fig. 4, is a detail showing the shutter mechanism in a different position; and Fig. 5, a perspective detail to be referred to.

Referring to the drawings A represents a suitable back frame adapted to receive and hold any suitable plate holder B containing one or more sensitized plates, films, or surfaces, and which may be of any desired construction, such not forming an essential part of this present invention.

C represents the front movable frame or board of the camera, said frame being connected in usual manner by a bellows $d$ with the fixed frame A, and also in the present instance by several systems of lazy tong levers $c$, the top and bottom systems of levers being connected at similar points with the side systems of levers as represented in Fig. 5, wherein the ends of the levers of one system are pivotally connected with the similar ends of the levers of another system through the medium of angle pieces $c^x$, so that a perfectly uniform movement of all the levers is obtained producing a regular and proper movement of the movable frame C with relation to the back frame A, the said levers being connected with the front and back frame respectively at the points 2, 3, and as herein shown are arranged within the bellows $d$.

The camera when not in use may be collapsed as in Fig. 2, into such space that it may be readily carried in one's pocket if desired, the camera for use being extended as represented in Fig. 1.

The movable frame C of the camera is provided with an aperture $e$, back of which is arranged a suitable lens $e'$, the aperture being normally closed by a suitable shutter $f$ pivoted at $f'$ and normally retained in its lowermost position Fig. 3, by a spring $f^2$, the shutter when in such position closing the aperture $e$ in the frame, the aperture $f^3$ in the shutter at such time lying some distance below the aperture in the frame. The operating lever $g$, also pivoted at $f'$, normally stands over and closes the aperture $f^3$ in the shutter, the said lever $g$ carrying a pivoted spring-controlled dog $g'$ which co-operates with a suitable ear or projection $f^x$ on the shutter to cause the shutter to be moved with the lever whenever the latter is moved. The lever $g$ is connected by means of a cord or other flexible connection $g^2$ with, in the present instance, one of the lazy tong levers $c$, said flexible connection being passed over the pulley or guide $g^3$, but if desired the said connection may be extended farther back and attached to the fixed frame A, or other part of the camera having a different movement from the front frame C.

An index plate $m$ pivoted at $m'$ on the front face of the movable frame C carries a tripping projection or pin $n$, which projects inwardly through a curved slot $n'$ in the movable frame and lies with its end in the path of movement of the tail of the tripping dog $g'$, as best shown in Fig. 3, so that when the lever $g$ is raised the tail of the tripping dog will strike the pin $n$ and be turned on its pivot to release the shutter and permit the latter to be returned to its normal position Fig. 3, independently of the lever $g$. The index plate $m$ is provided with a pointer or indicator $m^2$ which moves in front of or with relation to a suitable scale $m^3$ indicated upon the face of the movable frame, said scale being properly spaced and marked to indicate to what point the index plate $m$ should be turned to bring the lens $e'$ into proper focus with relation to the sensitized surface for exposure.

The camera is operated as follows:—Assuming it to be in its collapsed condition Fig. 2, if it is desired to photograph an object located, say at a distance of ten feet from the camera, the index plate $m$ will first be turned so that its pointer $m^2$ will point toward the index line marked 10 on the index $m^3$, such movement of the index plate moving the tripping pin $n$ into proper position to effect the exposure of the plate at the proper focus. The operator will then hold the back frame A firmly in one hand, or place the same upon some fixed support in proper position to receive the picture, a finder $o$ being utilized if necessary. When the camera has thus been properly positioned, the operator will move the movable front frame C outwardly toward the object to be photographed and away from the fixed frame A, such movement extending the levers $c$ and the bellows $d$. The front frame C by this movement is also moved with relation to the point of connection of the flexible cord $g^2$ with the lever $c$, or with relation to the back frame if the said cord is attached thereto, so that outward movement of the frame will cause the said cord or connection to draw the lever $g$ upwardly, the said lever by its dog $g'$ also moving with it the shutter $f$, the lever at such time being over and closing the aperture $f^3$ in the shutter, so that during the upward movement of the shutter no exposure is made. The lever $g$ and shutter $f$ are moved upwardly in unison until the tail of the dog $g'$ strikes the tripping pin $n$, which pin acts to throw the dog out of engagement with the shutter and permit the latter, actuated by the spring $f^2$ to be quickly returned to its full line position as in Fig. 3, and the aperture $f^3$ in the shutter during the return movement not being covered by the lever $g$ effects the exposure of the plate as it passes in front of the aperture $e$ in the frame. If the object to be photographed is at an estimated distance of one hundred feet from the camera, the index plate $m$ will be turned until its pointer reaches the mark 100 on the index, such movement of the index plate moving the tripping pin $n$ so that it will trip the dog $g'$ and permit exposure of the plate, when the front frame has been extended a less distance than before; and vice-versa, if the object is at an estimated distance of twenty feet from the camera, the index plate when turned so that its pointer will coincide with the mark 20 on the index will so move the pin $n$ as to permit the front frame to be extended to a greater distance than fifty feet before the shutter will be released to make exposure.
Inasmuch as the lens carried by the front frame must be moved farther from the sensitized surface when the object is near the camera than when it is removed at a distance therefrom the tripping pin $n$ may by the aid of a proper index $m^3$ be moved into position to trip the shutter and effect the exposure at any time during movement of the front frame when the lens reaches the position to properly focus the picture upon the surface. Thus it is only necessary to move the index plate $m$ into the position corresponding to the estimated distance of the object to be photographed from the camera, when the front frame C may be moved outwardly away from the back frame, even to its fullest distance, and the exposure is made at the proper time during such movement without further attention on the part of the operator. A spring $g^x$ returns the lever $g$ to its normal or lowermost position when the camera is collapsed, in which position the dog $g'$ automatically re-engages the projection $f^x$ on the shutter, and is then in readiness for a new exposure.

This invention is not limited to the particular construction and arrangement of the various parts, as the same may be varied within the scope of the invention, the features constituting which are set forth in the following claims.

I claim—
1. In a camera, two frames movable toward and from each other, one of which frames is provided with a lens, the other carrying a sensitized surface, combined with a shutter carried by the lens-carrying frame, mechanism connected with said shutter and actuated by the movement of one of said frames with relation to the other to automatically retract said shutter, and adjustable means to release the shutter automatically when a predetermined point in the movement of the frames has been reached, and at that point to effect the exposure of the plate, substantially as described.

2. In a camera, two frames movable toward and from each other, one of which frames carries a lens, and the other of which is adapted to receive a sensitized surface, combined with a shutter and its operating lever carried by the lens carrying frame, a locking device normally connecting said lever and shutter, and a connection between the said lever and some part of the camera having a different movement from that of the lens-carrying frame, whereby the lever and shutter are moved simultaneously by the movement of one of the frames with relation to the other to set the shutter, and adjustable means to automatically release the shutter when a predetermined point in the movement of the frames has been reached, and at that point to effect the exposure of the plate, substantially as described.

3. In a camera, two frames movable toward and from each other, one of the frames carrying a lens, and the other adapted to receive a sensitized surface, combined with a shutter on the lens-carrying frame, devices connecting said shutter with a portion of the camera having a different movement from that of the lens-carrying frame to move the shutter, and an adjustable tripping device located in the path of movement of said connecting devices to automatically trip the said shutter at any predetermined point in its movement, when a predetermined point in the movement of the frames has been reached, and at that point to effect the exposure of the plate, substantially as described.

4. In a camera, two frames movable with relation to each other, one of which carries a lens, and the other a sensitized surface, combined with a shutter pivoted on the inner side of the lens-carrying frame and actuated by the movement of the frames with relation to each other, and a movable index plate pivoted to the outer side of said lens-carrying frame, and a tripping device carried by said plate and to engage with and release the shutter automatically to determine the instant of exposure of the surface by the said shutter, substantially as described.

5. In a camera, two frames movable with relation to each other, one of which carries a lens, and the other a sensitized surface, combined with a shutter carried on the inner side of the lens-carrying frame and actuated by the movement of the frames with relation to each other, and a movable index plate upon the outer side of the lens-carrying frame, and a tripping device connected thereto to co-operate with and release the shutter to determine the instant of exposure of the plate by the said shutter, and a fixed index also on the outer side of the lens-carrying frame, and co-operating with said movable index plate to indicate the position of the tripping device with relation to the shutter, substantially as described.

In testimony whereof I have signed my name to this specification in the presence of two subscribing witnesses.

CARL G. OSTEMAN.

Witnesses:
FREDERICK L. EMERY,
EMMA J. BENNETT.